(12) United States Patent
Zhou et al.

(10) Patent No.: US 12,031,562 B2
(45) Date of Patent: Jul. 9, 2024

(54) FASTENING ASSEMBLY (71) Applicant: ZHONGSHAN MEITU PLASTIC IND. CO., LTD., Zhongshan (CN)

(72) Inventors: Wenhui Zhou, Zhongshan (CN); Haojia Huang, Zhongshan (CN); Hai Zhang, Zhongshan (CN); Jiafu Ma, Zhongshan (CN); Weinan Liang, Zhongshan (CN)

(73) Assignee: ZHONGSHAN MEITU PLASTIC IND. CO., LTD., Zhongshan (CN)

( * ) Notice: Subject to any disclaimer, the term of this patent is extended or adjusted under 35 U.S.C. 154(b) by 236 days.

(21) Appl. No.: 17/678,989

(22) Filed: Feb. 23, 2022

(65) Prior Publication Data
US 2023/0047591 A1 Feb. 16, 2023

(30) Foreign Application Priority Data
Aug. 11, 2021 (CN) .......................... 202121876730.X (51) Int. Cl.
| | | |
|---|---|---|
| F16B 13/08 | (2006.01) | |
| F16B 13/00 | (2006.01) | |
| F16B 13/12 | (2006.01) | |
| F16B 13/06 | (2006.01) | |

(52) U.S. Cl.
CPC .......... F16B 13/124 (2013.01); F16B 13/001 (2013.01); F16B 13/002 (2013.01); F16B 13/0808 (2013.01); *F16B 13/061* (2013.01)

(58) Field of Classification Search
CPC ..... F16B 13/0808; F16B 13/10; F16B 13/124

USPC .................................... 411/21, 340, 344–346
See application file for complete search history.

(56) References Cited

U.S. PATENT DOCUMENTS

| | | | | |
|---|---|---|---|---|
| 1,386,202 A | * | 8/1921 | Peterson ............. | F16B 13/0808 411/346 |
| 2,024,871 A | * | 12/1935 | Parsons ............... | F16B 13/0808 411/342 |
| 2,950,141 A | * | 8/1960 | Koff .................... | F16B 13/0808 292/256.73 |
| 3,127,807 A | * | 4/1964 | Modrey ............. | F16B 13/0808 411/965 |

(Continued)

FOREIGN PATENT DOCUMENTS

| | | |
|---|---|---|
| CA | 2592203 A1 | 12/2007 |
| FR | 1385043 A | 1/1965 |

*Primary Examiner* — Flemming Saether
(74) *Attorney, Agent, or Firm* — Bayramoglu Law Offices LLC (57) ABSTRACT

A fastening assembly includes a mounting cylinder frame, a movable part and a turnover part, the mounting cylinder frame is provided with a first vertical beam and a transmission rod, the mounting cylinder is provided with a butting block at the top of the first vertical beam, the transmission rod passes through the butting block, the side wall of the first vertical beam is provided with a bulge, the movable part is connected with the transmission rod, and the turnover part is arranged on the first vertical beam and rotationally connected with the movable part. The turnover part is butted with the bulge, the turnover part is located between the butting block and the movable part, and has a vertical state and a horizontal state. The transmission rod is used to drive the turnover part to switch between the horizontal state or the vertical state.

8 Claims, 8 Drawing Sheets

(56) References Cited

U.S. PATENT DOCUMENTS

| | | | | |
|---|---|---|---|---|
| 3,288,014 | A * | 11/1966 | Aackersberg | F16B 13/0808 |
| | | | | 411/344 |
| 3,532,024 | A | 10/1970 | Gutshall | |
| 4,502,826 | A | 3/1985 | Fafard | |
| 4,530,630 | A * | 7/1985 | Brown | F16B 13/04 |
| | | | | 411/340 |
| 6,579,050 | B2 * | 6/2003 | Ikuta | F16B 13/0808 |
| | | | | 411/340 |
| 6,764,261 | B1 * | 7/2004 | Stadler | E02D 29/1427 |
| | | | | 411/340 |
| 6,884,012 | B2 * | 4/2005 | Panasik | F16B 13/0833 |
| | | | | 411/29 |
| 11,486,432 | B2 * | 11/2022 | Sunkara | F16B 13/003 |
| 2009/0169331 | A1 | 7/2009 | Pilon | |
| 2022/0178393 | A1 * | 6/2022 | Ren | A47K 13/26 |

\* cited by examiner

FASTENING ASSEMBLY

CROSS REFERENCE TO THE RELATED APPLICATIONS

This application is based upon and claims priority to Chinese Patent Application No. 202121876730.X, filed on Aug. 11, 2021, the entire contents of which are incorporated herein by reference.

TECHNICAL FIELD

The disclosure relates to the technical field of connection, in particular to a fastening assembly.

BACKGROUND

In the prior art, the connection of two objects is usually realized by bolts and nuts. Specifically, the bolts are threaded through the mounting holes of the two objects, and the user correspondingly sets the nuts on the bolts to complete the connection of the two objects. Wherein, artificially aligning the set nuts will increase the labor intensity and affect the use experience of users.

SUMMARY

The disclosure aims to solve at least one of the technical problems existing in the prior art, and the disclosure provides a fastening assembly, which can reduce the labor intensity of users and optimize the use experience of users.

A fastening assembly, including a mounting cylinder frame, a movable part, and a turnover part. The mounting cylinder frame is provided with a first vertical beam and a transmission rod, the mounting cylinder frame is provided with a butting block at a top of the first vertical beam, the transmission rod passes through the butting block, and a side wall of the first vertical beam is provided with a bulge. The movable part is connected with the transmission rod. The turnover part is arranged on the first vertical beam and is rotatably connected with the movable part, the turnover part is butted with the bulge, the turnover part is located between the butting block and the movable part, and the turnover part has a vertical state and a horizontal state, wherein, the transmission rod is configured to drive the movable part to move along an axial direction of the first vertical beam, so as to drive the turnover part to switch between the horizontal state or the vertical state under an action of the bulge.

According to some embodiments, it has at least the following advantageous effects: through the above structure, when the fastening assembly passes through the mounting holes of the two objects, the turnover part can be switched from the vertical state to the horizontal state only through the transmission rod, wherein the turnover part in the horizontal state and the butting block together clamp the two objects, so as to complete the connection of the two objects. The above connection does not require the user to manually align the set nut. Therefore, the labor intensity of the user can be reduced to optimize the use experience.

According to some embodiments, the movable part includes the movable part body and a connecting block. The movable part body is slidably connected with the first vertical beam, the movable part body is rotationally connected with the turnover part, and the movable part body is provided with a mounting cavity. The connecting block is embedded in the mounting cavity, and the connecting block is sleeved on the transmission rod and threaded with the transmission rod.

According to some embodiments, the movable part body is provided with a connecting shaft, the turnover part is provided with a guide slot, and the connecting shaft passes through the guide slot.

According to some embodiments, the connecting block partially extends out of the mounting cavity, and the turnover part is provided with a snap notch matched with the extending portion of the connecting block; and the extending portion of the connecting block is embedded in the snap notch when the turnover part is in a horizontal state.

According to some embodiments, the movable part body is provided with an anti-falling block, and the anti-falling block is butted with the connecting block.

According to some embodiments, the mounting cylinder frame is provided with a second vertical beam, the second vertical beam, the first vertical beam and the transmission rod are arranged side by side, and the second vertical beam is slidably connected with the movable part body.

According to some embodiments, the first vertical beam is provided with a platform, and the turnover part in the vertical state is butted with the platform.

According to some embodiments, the first vertical beam is provided with an avoidance hole, and the avoidance hole is arranged corresponding to the bulge.

According to some embodiments, the first vertical beam is provided with a positioning block, the positioning block butts against a top of the movable part when the turnover part is in a vertical state.

According to some embodiments, the turnover part is provided with anti-skid teeth; and the anti-skid teeth are facing the butting block when the turnover part is in a horizontal state.

BRIEF DESCRIPTION OF THE DRAWINGS

The above and/or additional aspects and advantages of the present disclosure will become apparent and easy to understand from the description of the embodiments in combination with the following drawings, wherein.

REFERENCE MARK

Mounting cylinder frame 100, cylinder frame body 110, the first vertical beam 111, bulge 111A, platform 111B, avoidance hole 111C, positioning block 111D, butting block 112, second vertical beam 113, bolt 120, transmission rod 121;

Movable part 200, movable part body 210, the first sliding slot 211, connecting shaft 212, anti-falling block 213, the second sliding slot 214, connecting block 220;

Turnover part 300, the connecting arm 310, the turnover arm 320, the guide slot 321, the snap notch 322, the anti-skid teeth 323;

Gasket 400.

Detailed Description of the Embodiments

This part will describe the specific embodiment of the disclosure in detail. The preferred embodiment of the disclosure is shown in the attached drawings. The function of the attached drawings is to supplement the description of the text part of the description with graphics, so that people can intuitively and vividly understand each technical feature and the overall technical solution of the disclosure, but it cannot be understood as a limitation on the scope of the disclosure.

In the description of the disclosure, if there is a description that the first, second, third, fourth, fifth, etc. are only used to distinguish the technical features, tit cannot be understood as indicating or implying the relative importance, or implicitly indicating the number of the indicated technical features, or implicitly indicating the order of the indicated technical features.

In the description of the disclosure, it should be understood that the orientation or position relationship related to the orientation description, such as up, down, front, rear, left, right, etc., is based on the orientation or position relationship shown in the attached drawings, only for the convenience of describing the disclosure and simplifying the description, rather than indicating or implying that the device or element must have a specific orientation, or being constructed and operated in a specific orientation. Therefore, it cannot be understood as a limitation of the present disclosure.

In the disclosure, unless otherwise clearly defined, "provide", "install", "connected" and other words shall be understood in a broad sense. For example, it may be directly connected or indirectly connected through an intermediate medium; it may be fixed connection, detachable connection or integrated forming; it may be mechanical connection; it may be the connection between two elements or the interaction between two elements. Those skilled in the art can reasonably determine the specific meaning of the above words in the disclosure in combination with the specific contents of the technical solution.

Referring to FIGS. 1 to 8, an embodiment of the present disclosure relates to a fastening assembly, including a mounting cylinder frame 100, a movable part 200 and a turnover part 300.

The mounting cylinder frame 100 is provided with a first vertical beam 111 and a transmission rod 121 which are arranged side by side. The mounting cylinder frame 100 is provided with a butting block 112 at the top of the first vertical beam 111, the transmission rod 121 passes through the butting block 112, and the side wall of the first vertical beam 111 is provided with a bulge 111A. The movable part 200 is connected with the transmission rod 121. The turnover part 300 is rotationally connected with the movable part 200. The turnover part 300 is butted with the bulge 111A, the turnover part 300 is located between the butting block 112 and the movable part 200, and the turnover part 300 has a vertical state and a horizontal state. Wherein the transmission rod 121 can drive the movable part 200 to move along the axial direction of the first vertical beam 111 to come close or move away from the butting block 112, so as to drive the turnover part 300 to turnover under the force of the bulge 111A, so as to switch between the horizontal state or the vertical state.

Figure 1:
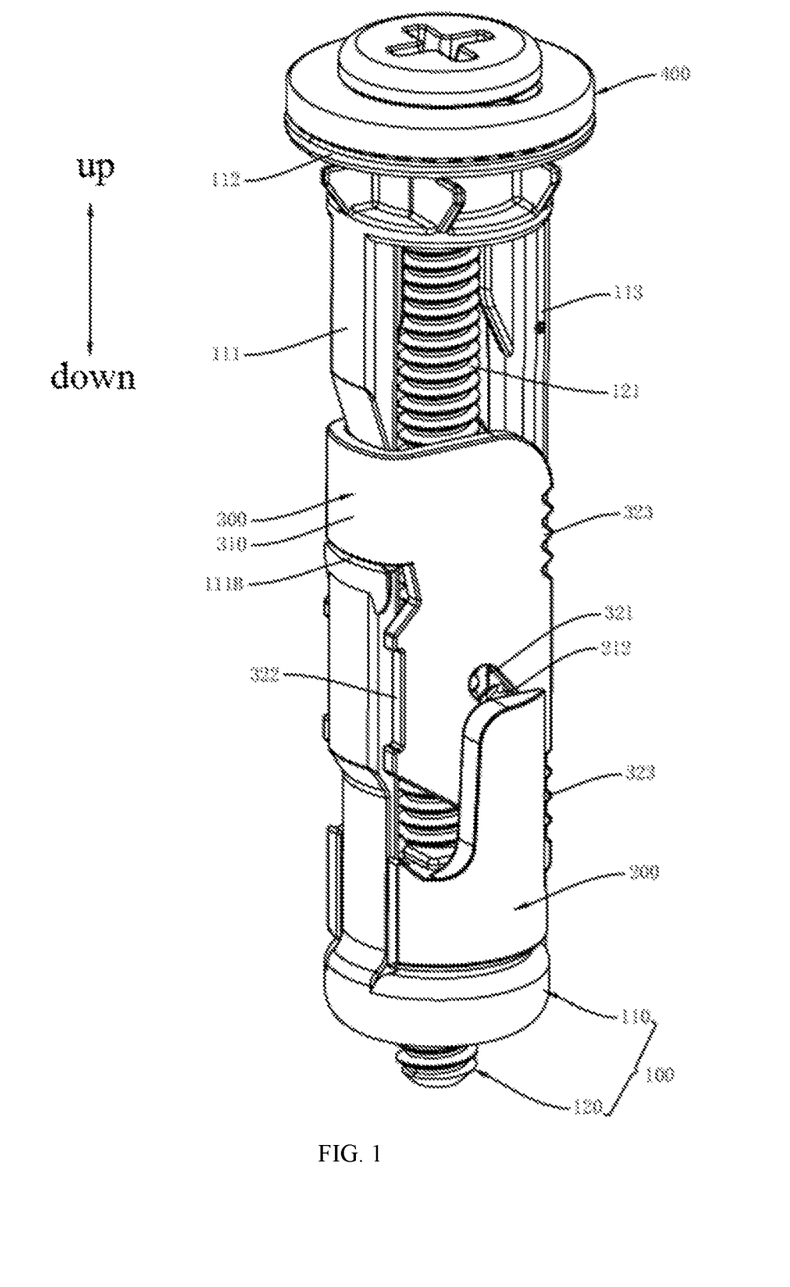
FIG. 1 is a structural diagram of an embodiment of the fastening assembly of the present disclosure.
Figure 2:
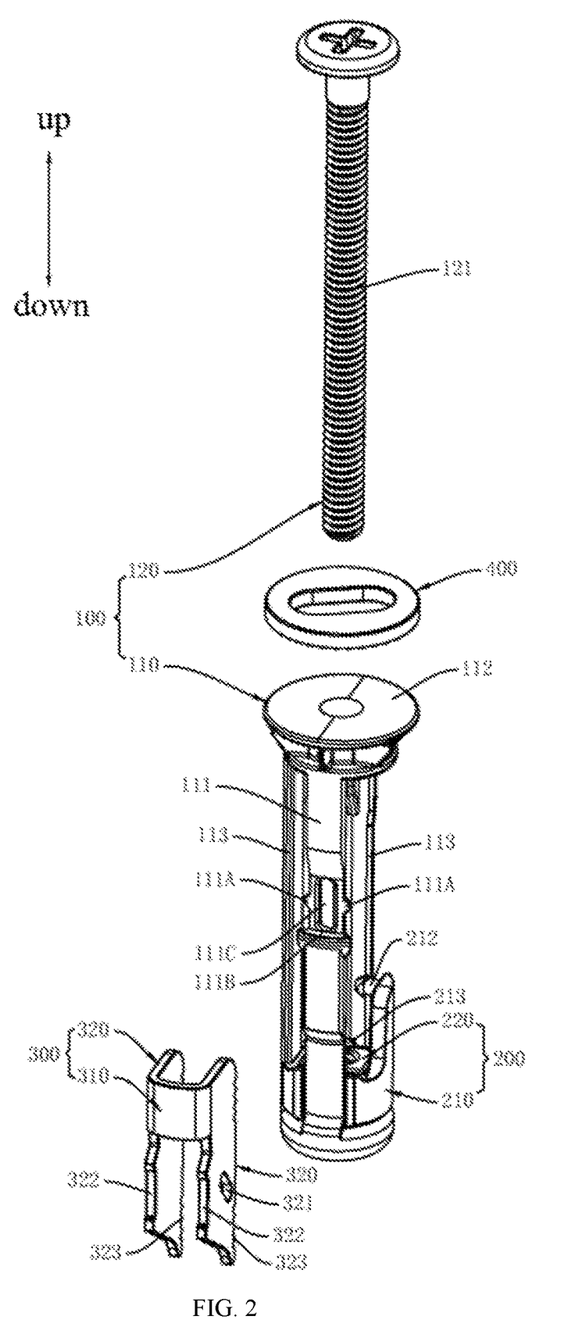
FIG. 2 is a partially exploded view of the fastening assembly shown in FIG. 1.

In this embodiment, referring to FIG. 1 and FIG. 2, the top projection of the turnover part 300 is in a U shape. The turnover part 300 includes a connecting arm 310 and two opposite turnover arms 320. Both ends of the connecting arm 310 are respectively connected with the two turnover arms 320. Both sides of the first vertical beam 111 are provided with bulges 111A, and the two bulges 111A are butted with the inner walls of the two turnover arms 320 one by one. The turnover arm 320 is rotatably connected with the movable part 200, wherein the connecting arm 310 and the two turnover arms 320 are an integrated structure.

Referring to FIG. 1, FIG. 5, FIG. 7 and FIG. 8, the transmission rod 121 can drive the movable part 200 to move in the direction close to the butting block 112. The movable part 200 moving close to the butting block 112 pushes the rotating arm 320 to overturn, so that the turnover arm 320 switches to the horizontal state under the friction force of the bulge 111A. When the turnover arm 320 switches to the horizontal state, the turnover arm 320 butts with the movable part 200, the turnover arm 320 remains horizontal, and the movable part 200 can continue to push the turnover arm 320 in the horizontal state so that the turnover arm 320 continues to move in the direction close to the butting block 112.

In addition, the transmission rod 121 can drive the movable part 200 to move away from the butting block 112, and the movable part 200 moving away from the butting block 112 pulls the turnover arm 320 to move, so that the turnover arm 320 is turnover to the vertical state under the friction force of the bulge 111A.

It should be noted that the two bulges 111A are butted with the inner walls of the two turnover arms 320 one by one, which shows that the turnover part 300 is arranged on the first vertical beam 111.

Through the above structure, when the fastening assembly passes through the mounting holes of the two objects, the turnover part 300 can be switched from the vertical state to the horizontal state only through the transmission rod 121. The turnover part 300 in the horizontal state and the butting block 112 together clamp the two objects to complete the connection of the two objects. The above connection does not require the user to manually align the set nut. Therefore, it can reduce the labor intensity of users and optimize the user experience.

It can be understood that the above fastening assembly can also connect three, four or more objects.

Figure 5:
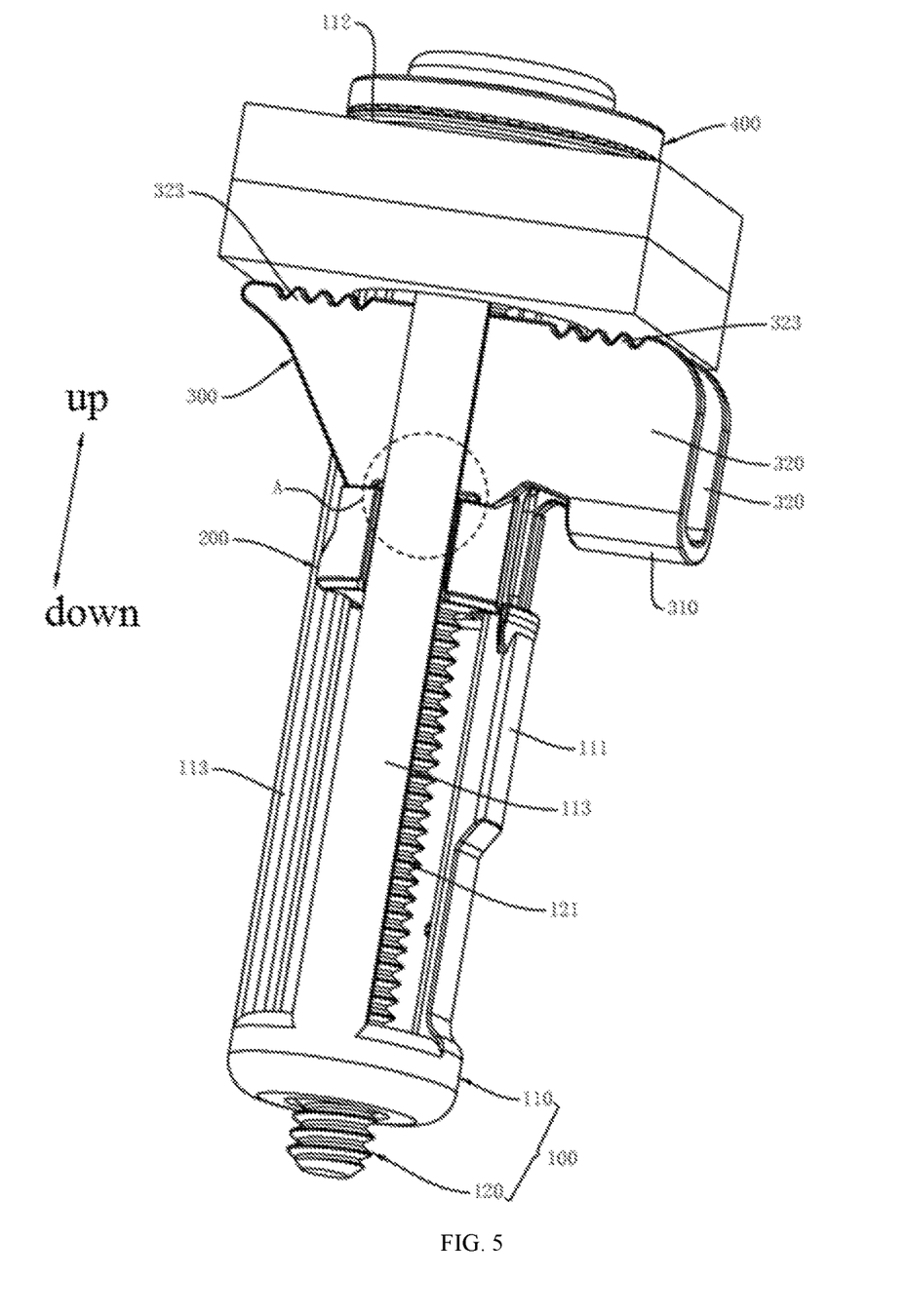
FIG. 5 is a structural diagram of the fastening assembly shown in FIG. 1 when connecting two objects.

It can also be understood that, referring to FIG. 5, the horizontal length of the turnover part 300 in the horizontal state is greater than the aperture of the mounting hole.

In this embodiment, referring to FIGS. 1 and 5, the turnover arm 320 is provided with anti-skid teeth 323. When the turnover arm 320 is in a horizontal state, the anti-skid teeth 323 are facing the butting block 112.

Through the above structure, the anti-skid teeth 323 and the butting block 112 together clamp the two objects, so as to increase the clamping effect of the two objects and optimize the connection stability of the two objects.

In this embodiment, referring to FIG. 2, the first vertical beam 111 is provided with an avoidance section, the avoidance section is provided with an avoidance hole 111C, and the side wall of the avoidance section is provided with a bulge 111A.

Through the above structure, the arrangement of the avoidance hole 111C can make the two bulges 111A suitable for coping with the force when the turnover part 300 moves and overturn, so as to avoid the damage of the two bulges 111A due to too rigid.

Figure 3:
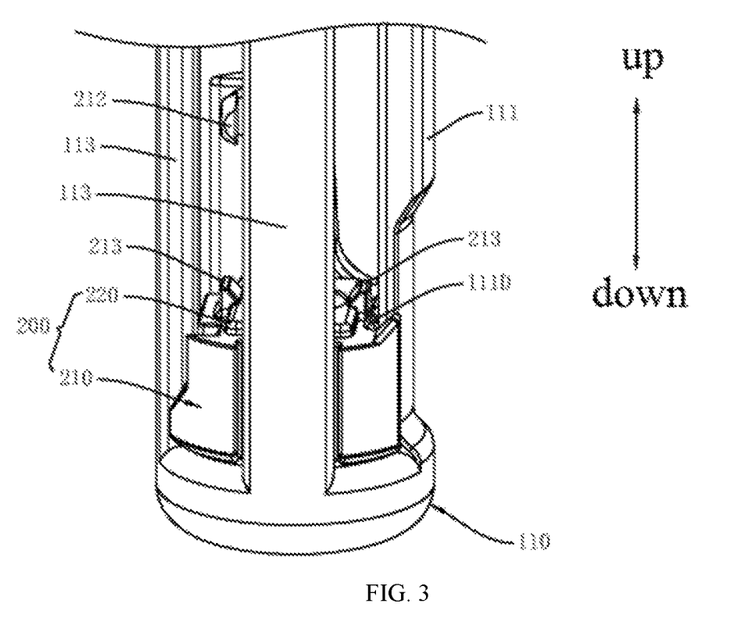
FIG. 3 is a structural diagram of the mounting cylinder frame and the movable part shown in FIG. 2.

In this embodiment, referring to FIG. 3, the first vertical beam 111 is provided with a positioning block 111D. When the turnover part 300 is in the vertical state, the positioning block 111D butts against the top of the movable part 200.

Through the above structure, it can be determined that when the turnover part 300 is in the vertical state, the movable part 200 is at the position of the transmission rod 121.

The mounting cylinder frame 100 includes a cylinder frame body 100 and a bolt 120.

Referring to FIGS. 1 to 2, the cylinder frame body 100 is provided with the first vertical beam 111 and the butting block 112, the bolt 120 is threaded through the cylinder frame body 110, the head of the bolt 120 is located above the butting block 112, and the rod portion of the bolt 120 is the transmission rod 121.

In some embodiments, the mounting cylinder frame 100 includes a cylinder frame body 100 and a push rod member, the cylinder frame body 100 is provided with the first vertical beam 111 and the butting block 112, the push rod member is arranged on the mounting cylinder frame 100, and the rod part of the push rod member is the transmission rod 121.

In order to reduce the friction between the bolt 120 and the cylinder frame body 110, referring to FIG. 1 and FIG. 2, it also includes a gasket 400. The gasket 400 is sleeved on the transmission rod 121, and the gasket 400 is located between the butting block 112 and the head of the bolt 120.

In order to improve the stability of the turnover part 300 in the vertical state, referring to FIG. 2, the first vertical beam 111 is provided with a platform 111B, and the connecting arm 310 of the turnover part 300 in the vertical state is butted with the platform 111B.

The movable part 200 includes a movable part body 210 and a connecting block 220.

Figure 4:
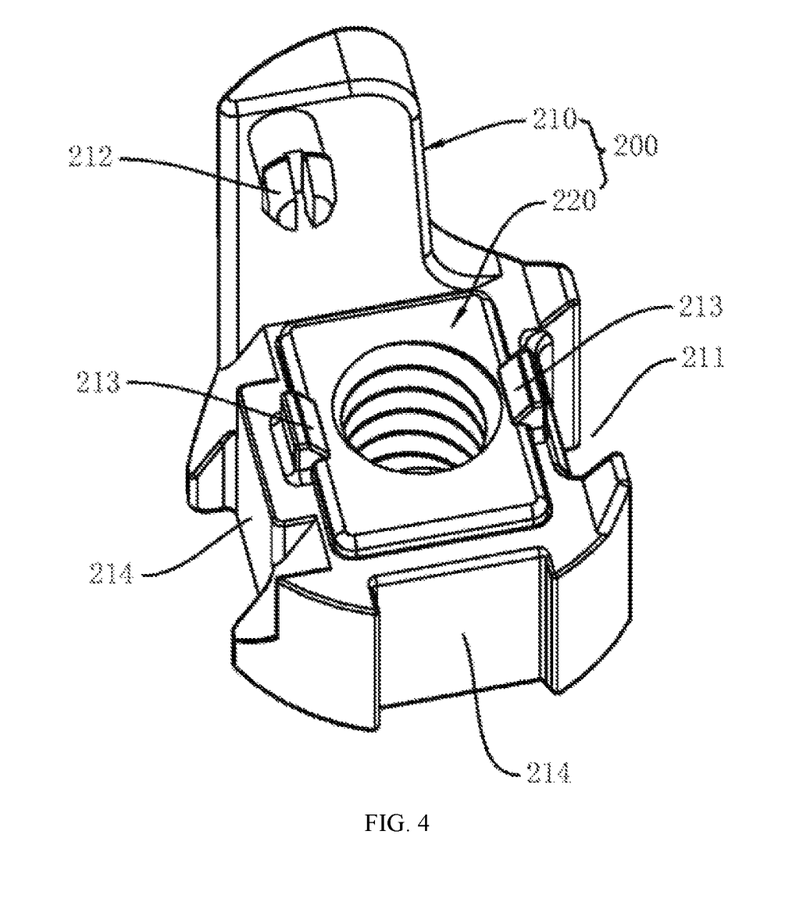
FIG. 4 is a structural diagram of the movable part shown in FIG. 2.

Referring to FIGS. 2 and 4, the movable part body 210 is slidably connected with the first vertical beam 111, the movable part body 210 is rotationally connected with the turnover arm 320, the movable part body 210 is provided with a mounting cavity, the connecting block 220 is embedded in the mounting cavity, and the connecting block 220 is sleeved on the transmission rod 121 and threaded with the transmission rod 121. The connecting block 220 is provided with a polygonal nut, and the mounting cavity is matched with the connecting block 220.

In this embodiment, the bottom of the mounting cavity is provided with an avoidance hole for the transmission rod 121 to pass through.

The movable part body 210 is slidably connected with the first vertical beam 111. Specifically, referring to FIG. 2, FIG. 3 and FIG. 4, the movable part body 210 is provided with a first sliding slot 211, and the first vertical beam 111 is slidably arranged in the first sliding slot 211.

In order to increase the sliding stability of the movable part body 210, referring to FIG. 2, FIG. 3 and FIG. 4, the cylinder frame body 110 is further provided with a second vertical beam 113, the second vertical beam 113, the first vertical beam 111 and the transmission rod 121 are arranged side by side. The movable part body 210 is provided with a second sliding slot 214 corresponding to the second vertical beam 113, and the second vertical beam 113 is slidably arranged in the second sliding slot 214.

In this embodiment, referring to FIG. 1 and FIG. 5, a limit space is formed between the first vertical beam 111 and part of the second vertical beam 113, wherein one turnover arm 320 is located in the limit space. Through the above structure, it can prevent the turnover part 300 from disengaging when moving and flipping.

In this embodiment, the number of the second vertical beam 113 and the second sliding slot 214 is set to two.

In some embodiments, the number of the second vertical beam 113 and the second sliding slot 214 is set to three, four, etc.

The movable part body 210 is rotationally connected with the turnover arm 320. Specifically, referring to FIGS. 3 to 4, the movable part body 210 is provided with a connecting shaft 212, the turnover arm 320 is provided with a guide slot 321, and the connecting shaft 212 passes through the guide slot 321.

Through the above structure, during the movement and turnover of the turnover part 300, the connecting shaft 212 slides in the guide slot 321 and rotates relative to the turnover arm 320.

In order to prevent the connecting block 220 from falling out of the mounting cavity. Referring to FIG. 4, the movable part body 210 is provided with an anti-falling block 213, wherein the anti-falling block 213 is butted against the connecting block 220.

Figure 6:
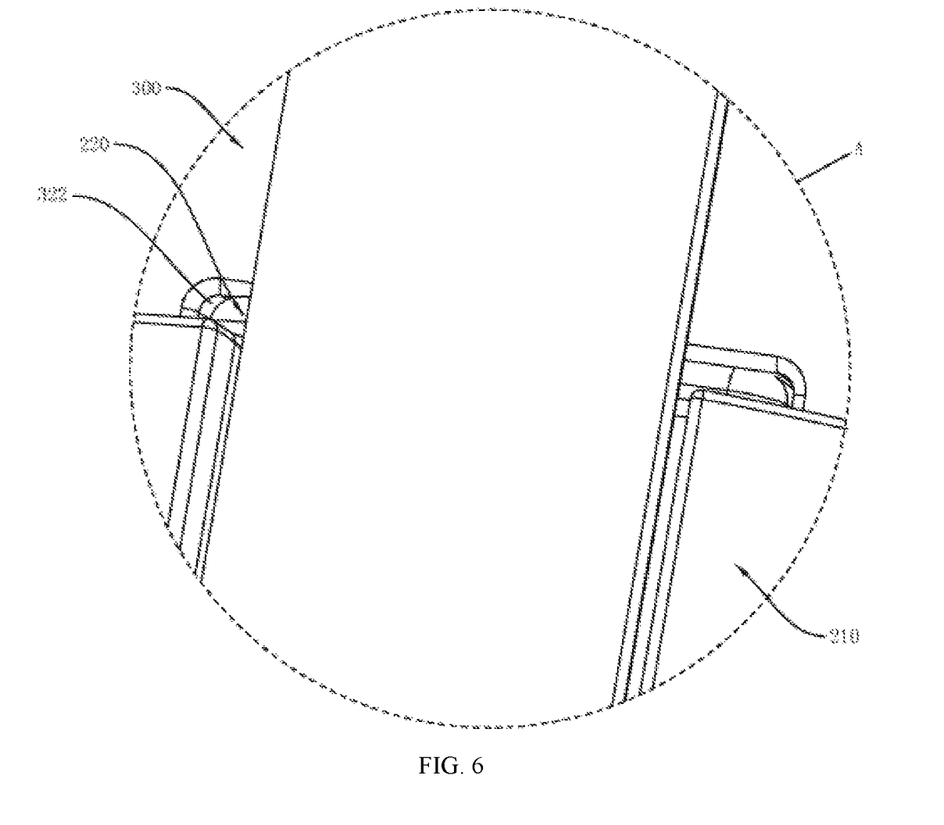
FIG. 6 is a partially enlarged view of part A shown in FIG. 5.
Figure 7:
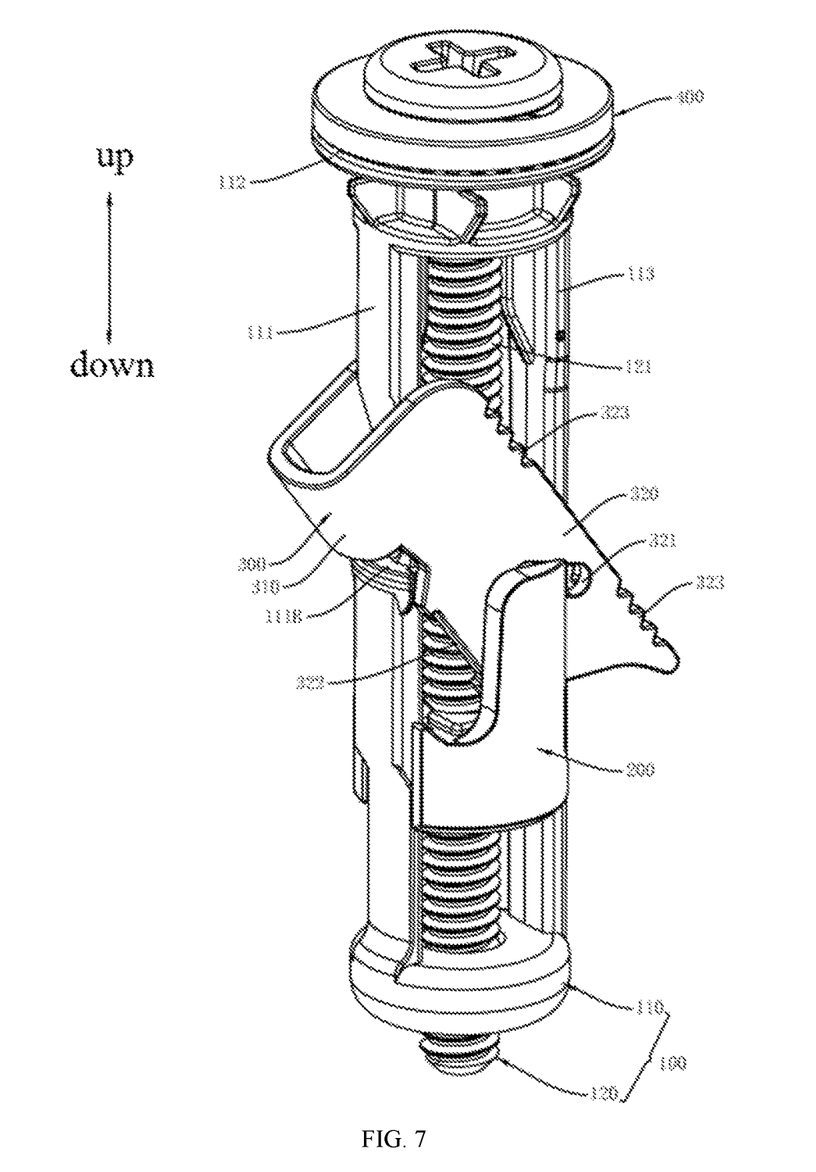
FIG. 7 is another structural diagram of the fastening assembly shown in FIG. 1.
Figure 8:
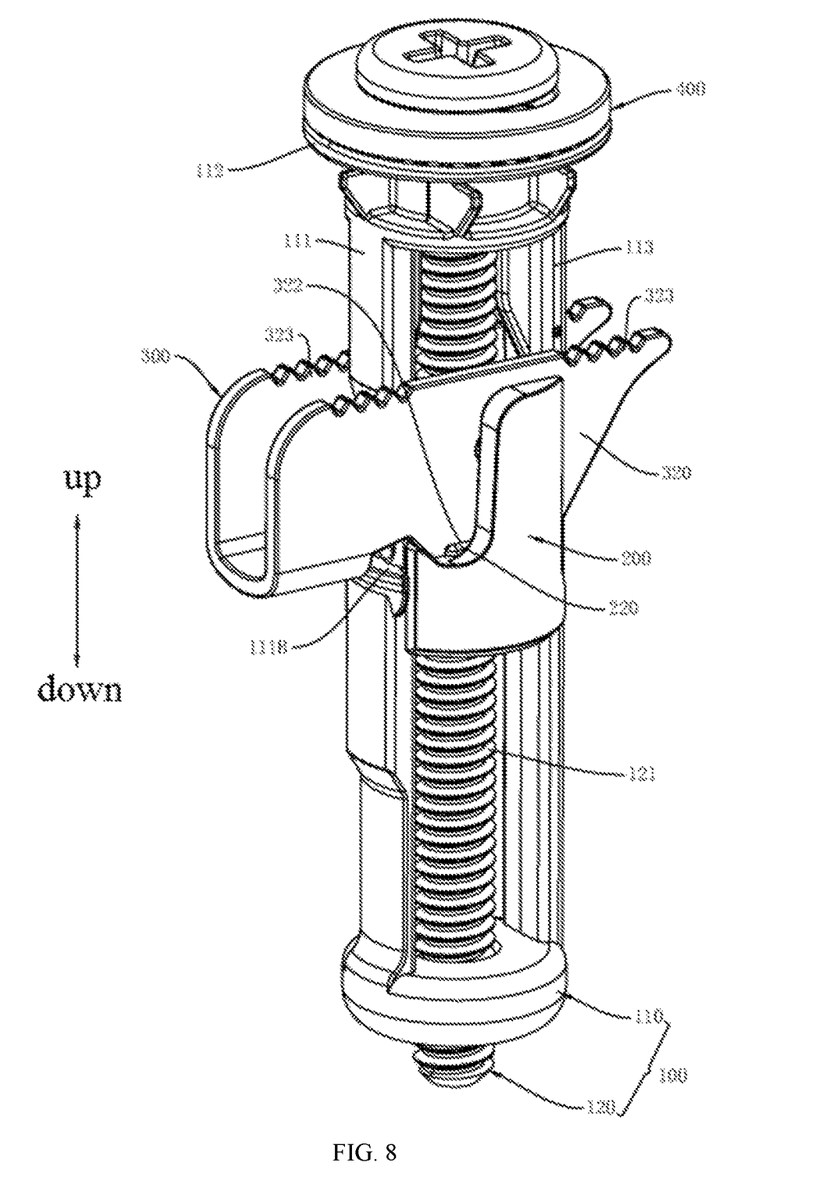
FIG. 8 is another structural diagram of the fastening assembly shown in FIG. 1.

In this embodiment, referring to FIG. 5, FIG. 6 and FIG. 8, the connecting block 220 partially extends out of the mounting cavity, and the turnover arm 320 is provided with a snap notch 322 matched with the extending portion of the connecting block 220. When the turnover arm 320 is in a horizontal state, the extending portion of the connecting block 220 is embedded in the snap notch 322.

Through the above structure, the extending portion of the connecting block 220 is embedded in the snap notch 322 to increase the stability of butting between the turnover part 300 and the movable part 200, and can be further limited to the connecting block 220 in the mounting cavity.

Of course, the present disclosure is not limited to the above embodiments. Those skilled in the art can also make equivalent modification or replacement without departing the spirit of the disclosure. These equivalent modification and replacement are included in the scope defined by the claims of the application.

What is claimed is:
1. A fastening assembly, comprising:
a mounting cylinder frame, wherein the mounting cylinder frame is provided with a first vertical beam and a transmission rod, the mounting cylinder frame is provided with a butting block at a top of the first vertical beam, the transmission rod passes through the butting block, and a side wall of the first vertical beam is provided with a bulge;
a movable part, wherein the movable part is connected with the transmission rod, and the movable part comprises a movable part body and a connecting block;
a turnover part, wherein the turnover part is arranged on the first vertical beam and the movable part body is rotationally connected with the turnover part, the turnover part is butted with the bulge, the turnover part is located between the butting block and the movable part, and the turnover part has a vertical state and a horizontal state,
wherein the transmission rod is configured to drive the movable part to move along an axial direction of the first vertical beam, so as to drive the turnover part to switch between the horizontal state or the vertical state under an action of the bulge;

the movable part body is slidably connected with the first vertical beam, and the movable part body is provided with a mounting cavity;

the connecting block is embedded in the mounting cavity, and the connecting block is sleeved on the transmission rod and threaded with the transmission rod; and the movable part body is provided with a connecting shaft, the turnover part is provided with a guide slot, and the connecting shaft passes through the guide slot.

2. The fastening assembly according to claim 1, wherein the connecting block partially extends out of the mounting cavity, and the turnover part is provided with a snap notch matched with an extending portion of the connecting block; and the extending portion of the connecting block is embedded in the snap notch when the turnover part is in the horizontal state.

3. The fastening assembly according to claim 1, wherein the movable part body is provided with an anti-falling block, and the anti-falling block is butted with the connecting block.

4. The fastening assembly according to claim 1, wherein the mounting cylinder frame is provided with a second vertical beam, the second vertical beam, the first vertical beam and the transmission rod are arranged side by side, and the second vertical beam is slidably connected with the movable part body.

5. The fastening assembly according to claim 1, wherein the first vertical beam is provided with a platform, and the turnover part in the vertical state is butted with the platform.

6. The fastening assembly according to claim 1, wherein the first vertical beam is provided with an avoidance hole, and the avoidance hole is arranged to correspond to the bulge.

7. The fastening assembly according to claim 1, wherein the first vertical beam is provided with a positioning block, the positioning block butts against a top of the movable part when the turnover part is in the vertical state.

8. The fastening assembly according to claim 1, wherein the turnover part is provided with anti-skid teeth; and the anti-skid teeth are facing the butting block when the turnover part is in the horizontal state.

\* \* \* \* \*